PRINT HAMMER UNIT FOR HIGH SPEED PRINTERS

Original Filed July 19, 1965 8 Sheets-Sheet 1

INVENTORS
SIEGHARD ARNOLD
GEROLD BUHRMANN
JURGEN HAASIS
HORST HEINRICH
MANFRED NITSCHKE
GUNTHER SCHACHT
EBERHARD SPIETH

BY Francis V. Giolma
ATTORNEY

PRINT HAMMER UNIT FOR HIGH SPEED PRINTERS

Original Filed July 19, 1965 8 Sheets-Sheet 2

PRINT HAMMER UNIT FOR HIGH SPEED PRINTERS

Original Filed July 19, 1965 8 Sheets-Sheet 3

PRINT HAMMER UNIT FOR HIGH SPEED PRINTERS

Original Filed July 19, 1965 8 Sheets-Sheet 4

PRINT HAMMER UNIT FOR HIGH SPEED PRINTERS

Original Filed July 19, 1965 8 Sheets-Sheet 6

United States Patent Office

Re. 27,175
Reissued Sept. 21, 1971

27,175
PRINT HAMMER UNIT FOR HIGH SPEED PRINTERS

Sieghard Arnold, Hildrizhausen, Gerold Buhrmann, Stuttgart, Jurgen Haasis, Boblingen, Horst Heinrich, Berlin, Manfred Nitschke, Stuttgart-Rohr, Gunter Schacht, Boblingen, and Eberhard Spieth, Holzgerlingen, Germany, assignors to International Business Machines Corporation, Armonk, N.Y.

Original No. 3,359,921, dated Dec. 26, 1967, Ser. No. 473,093, July 19, 1965. Application for reissue Apr. 29, 1968, Ser. No. 728,093
Claims priority, application Germany, July 25, 1964, J 26,273
Int. Cl. B41j *9/00;* B23p *19/00*
U.S. Cl. 101—93 20 Claims

Matter enclosed in heavy brackets [ ] appears in the original patent but forms no part of this reissue specification; matter printed in italics indicates the additions made by reissue.

ABSTRACT OF THE DISCLOSURE

Printing apparatus for a high speed printer having an elongated print hammer with an upstanding armature portion at the end remote from the print line and a pair of parallel flat springs supporting the print hammer. An electromagnet having a hold winding for producing magnetic flux to hold the print hammer in a retracted position and means for reducing the magnetic flux below the holding value to permit the support springs to actuate the hammer to a printing position.

This invention relates to a print hammer unit, and in particular to a print hammer unit for a high speed printer which is used as an output device for an electronic data processing machine.

Generally, modern high speed printers of this type work in such a manner that a type carrier is provided which contains several sets of all characters to be printed, and which carries out a periodic movement so that each printable character is offered to each print position of a print line. A rotating type drum, a type chain, moving in the print line direction or a type bar moving back and forth periodically in the print line direction can be used a type carrier. At each print position of a print line a print hammer is provided which is released at a suitable moment, i.e., when the type to be printed is in the corresponding print position. For the control of the print hammer impact an electronic representation is formed of the print type which is in an individual print positions each time, with reference to a certain position of the type carrier. In a so-called scan, in passing from print position to print position, this electronic representation is compared with the text of a print line which is also stored electronically in a data processing machine. If the two coincide for any print position, the print hammer corresponding to this print position is released.

A particularly difficult problem connected with such high speed printers occurs in the print hammer mechanism. On the one hand, it is very difficult to make the individual print hammers and their drives of such an extreme flatness that they do not take up more space than the width of a print character, and to arrange all the print hammers closely packed in a row of approximately 130 print positions forming the print line, and to also provide for adjustment thereof. On the other hand, the print hammers should have a considerable but clearly defined amount of kinetic energy in order to obtain a uniform print on several copies, and the hammer motion, with the hammer flight time of some milliseconds' duration, has to be exactly reproducible. As in general such printers follow the principle of one-the-fly impact, that is, as the type carrier is not stopped by the hammer impact, the contact of the print hammer with the type flying by must be of very short duration.

A well known print hammer mechanism for such high speed printers works in such a manner that the armature and electromagnet accelerate the print hammer. As the magnet only fires the print hammer, which then moves on in free flight, a great number of factors have to be taken into consideration with regard to the hammer motion, and an exactly reproducible hammer motion can be obtained only with great difficulty.

In another well known print hammer mechanism rotational kinetic energy is transferred through a cam or through a pushing process onto the print hammer. In that application the electromagnet only effects the release of the print hammer at a predetermined moment, but as the print hammer energy is taken from a continuously rotating drive, it is possible to obtain a greater exactness in the hammer motion. Such a mechanism, however, presents considerable construction difficulties, in particular on account of the high mechanical stress on the parts participating in the push process at increased speeds. The inertia of the control elements is another factor impeding an increase in speed with this type of mechanism.

In another print hammer mechanism known to the art, potential energy stored in a spring is used for the print hammer drive. In that system the print hammer is shiftably arranged in a guide, and a stretched spring is gripped by a latch. Here too, the release takes place through a control mechanism operated by an electromagnet.

In order to avoid the disadvantages connected with the use of mechanical control parts, and to reduce the inertia in the control of the print hammer release, it is also known to hold the print hammer against the force of a stretched spring through the use of a magnet, and to de-excite the magnet to obtain the print hammer release. In a well known print hammer unit of that kind the print hammer is supported suitably on an axle and is designed as a two-armed lever, the one lever arm of which serves as an armature, whereas the actuating spring engages the other lever arm. This print hammer mechanism, however, has as one of its disadvantages the fact that the support of the print hammer on an axle requires an uncomfortably large width for the hammer drives. Through this support, friction losses are caused, which consume part of the hammer energy. Besides it is quite difficult to adjust all print hammers in such a manner that they fit against the various magnets without air gaps, which is a condition absolutely necessary for obtaining an accurately defined hammer motion. Finally, the magnet windings have to be housed in a very narrow winding space. This limits the power of the holding magnets, which in turn puts a limit on the strength of the driving spring. Furthermore, this print hammer unit is complicated in its construction and requires a large amount of maintenance.

This invention, the aim of which is to provide a print hammer unit working quickly and exactly, and which does not take up much space and operates very safely, in addition to using a minimum of wearable parts requiring maintenance, relates to a print hammer unit where potential energy which has been stored in a spring is used for print hammer actuation, and where the print hammer release is effected through deactivation of the magnet holding the tensioned print hammer.

In order to avoid the aforementioned disadvantages, the print hammer unit of the present invention is of such a design that potential energy is stored in elastic elements, preferably flat springs, which are relatively rigid to tensile and torsional stress, and are subjected to bending only, and which at the same time provide supports for the print hammer, and are arranged in such a manner hat the print hammer motion consists of a parallel novement.

Using this principle, a printing unit as disclosed by his invention is advantageously constructed in such a nanner that the print hammers are formed as flat rods ıaving a bent portion serving as an armature. Said rods 'orm components of an operational flatness which can ɔe replaced individually, along with their supports which :onsist of two flat springs arranged vertically and fixed n a foot plate.

More advantages of the print hammer unit as disclosed ɔy this invention are that the tensioned print hammers ıssociated with the individual print positions are held by neans of electromagnets consisting of a magnet yoke ırranged at each print position and a magnet winding :ommon to all the magnet yokes, and that for the de-ıctivation of the electromagnets holding the tensioned ɔrint hammers, release windings are arranged at the in-lividual print positions on the magnet yokes in such a nanner that the magnetic field each produces, compen-ıates or neutralizes the field of the holding magnet, or 'emoves it from the armature, respectively.

In order to obtain a very short and well defined release ime of the armature at the print hammer release, the ɔrint hammer unit as disclosed by the invention is of ıuch a design that the magnetic field of the holding magnet s overcompensated for, through the magnetic field of he releasing magnet at the point position in question. Furthermore, the present invention provides for the hold-ng winding, which is continuously energized and which s common to all magnet yokes, to be connected in series vith an inductance of a high value in order to avoid the nfluences of changes of the magnetizing force at the ndividual magnet yokes on the holding flux.

For obtaining a holding force independent of voltage 'ariations it is advantageous that the magnet yokes near heir pole faces have a cross section which is reduced n comparison with the cross section of the remainder of he magnetic circuit, so that in that area they are mag-ıetized to the saturation point.

An important advantage of the print hammer unit as lisclosed in the present invention is that the magnet yokes, ɔreferably in pairs, are secured by means of tensioned :lamps to bars mounted on a support. It has been found o be desirable to have impressed in the faces of the bar ıurfaces and the inner jaws of the tensioned clamps press-ng the magnet yokes against the bars, respectively, hard :rystals such as sintered $Al_2O_3$ (corundum). This has the :ffect that the magnet yokes are so aligned individually ıgainst their print hammers that upon excitation of the nold magnets, and when their respective clamps have ɔeen released by a key, they locate themselves against he corresponding magnet armature without an air gap ɔeing formed. It is thus possible to adjust all magnet 'okes within the shortest time through a simple manipu-ation without the risk of twisting or overtensioning of he support holding the magnet yokes.

The print hammer unit disclosed by the invention is of ıuch structure that the magnet yoke support is equally ıupported on leaf springs which are arranged in such ı manner that it can be shifted with a parallel motion, ınd then it carries out a movement of going periodically ɔack and forth and being directed in a vertical direction 'elative to the platen which serves for the return of the ired print hammers. Such movement is preferably ef-'ected by means of a cam gear.

An uncomplicated and safe method of securing and ıdjusting the individual print hammer units is obtained n the printing device as disclosed by the invention, by ıecuring the print hammer units, preferably in pairs, by neans of foot plates to stationary guiding plates so that he print hammer units can be shifted or adjusted in-lividually.

In order to guarantee uniform connections at the clamp-ng points of the leaf springs carrying the print hammers, the leaf spring structures are designed in such a manner that the springs carrying the print hammers are surrounded at their tops and bottoms with coatings of an elastic substance which fills cavities in the print hammers and the foot plates in which the spring ends are welded, said coatings being tapered towards the middle of the springs.

Another advantage of the print hammer unit as disclosed by this invention is that spring U-bolts are provided which slide in the direction of the leaf springs carrying the print hammers, and which furthermore fit against the leaf springs at their ends and which are combined structurally to be slidably supported in the foot plate of the corresponding print hammer unit. These U-bolts serve for adjusting the hammer flight time. Through a small shifting of these U-bolts the manufacturing tolerances in the thickness of the leaf springs carrying the print hammers can be compensated for.

Finally the print hammer unit of this invention is characterized in that at the individual print positions elastically fixed damping material is provided which absorbs the energy of the print hammers moving back after the print impact, and which by means of elastic stops, locks the print hammers until the magnet yokes, when moved to their extreme forward positions, have magnetically attracted their respective hammers. In an advantageous manner the damping material is arranged on a support extending over all of the print positions, which support is pivotally movable for a short time to release stops in a downward direction, by means of an axle. This support is pivotally movable for a short time to release the print hammers, preferably by means of a cam gear.

The foregoing and other objects, features and advantages of the invention will be apparent from the following more particular description of a preferred embodiment of the invention, as illustrated in the accompanying drawings.

Figure 1:
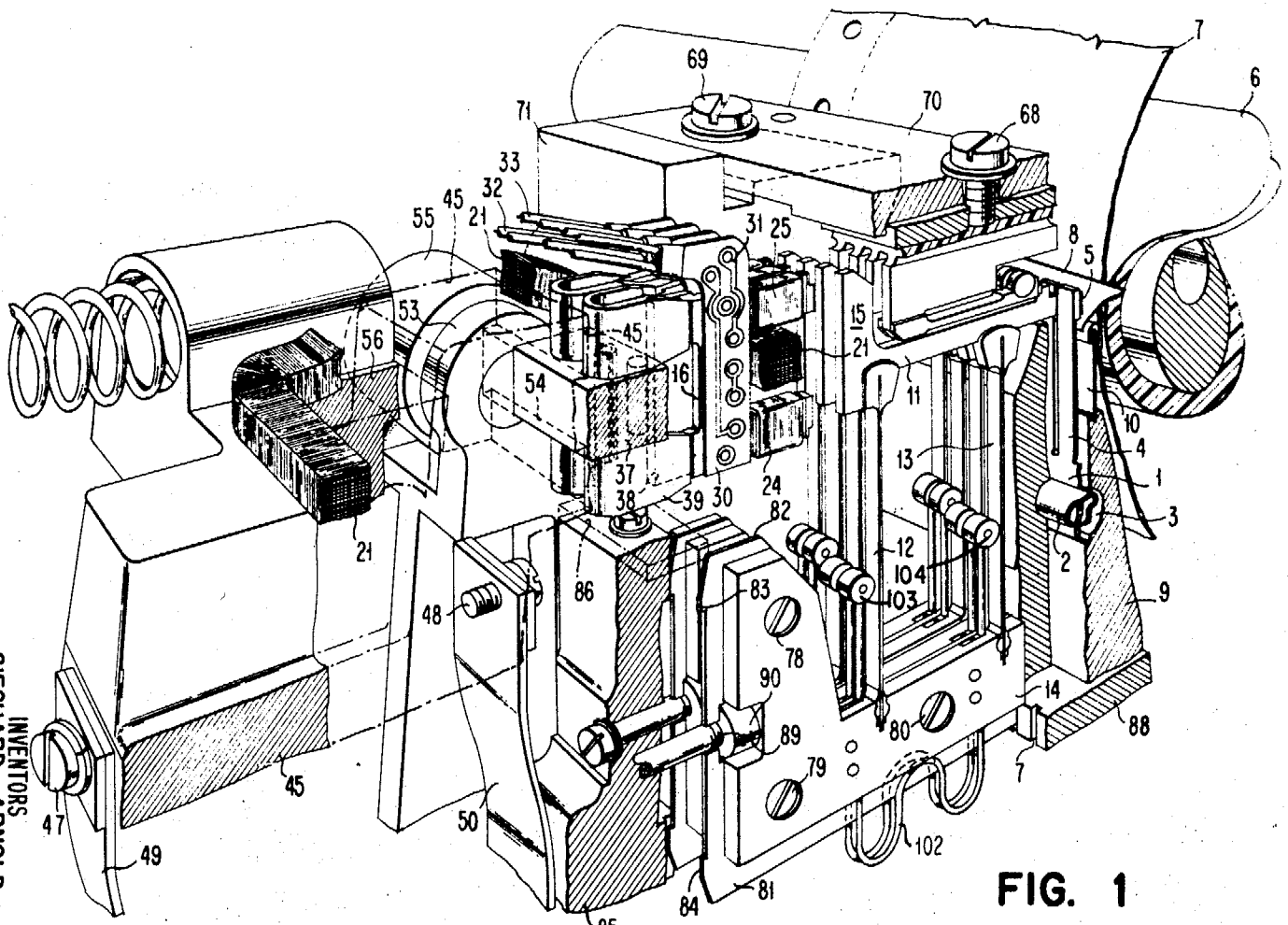
FIG. 1 is a partly broken away perspective drawing of a print hammer unit embodying the invention in one of its forms.
Figure 3:
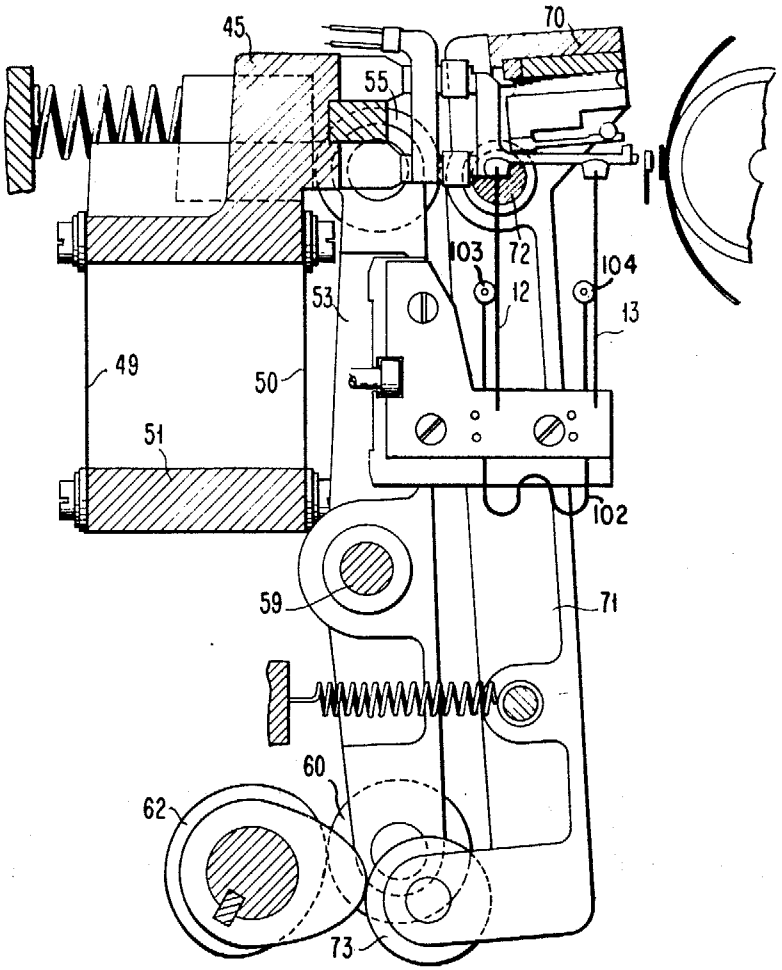
FIG. 3 is the same view as shown in FIG. 2 but at the beginning of the restore motion of the print hammer.
Figure 2:
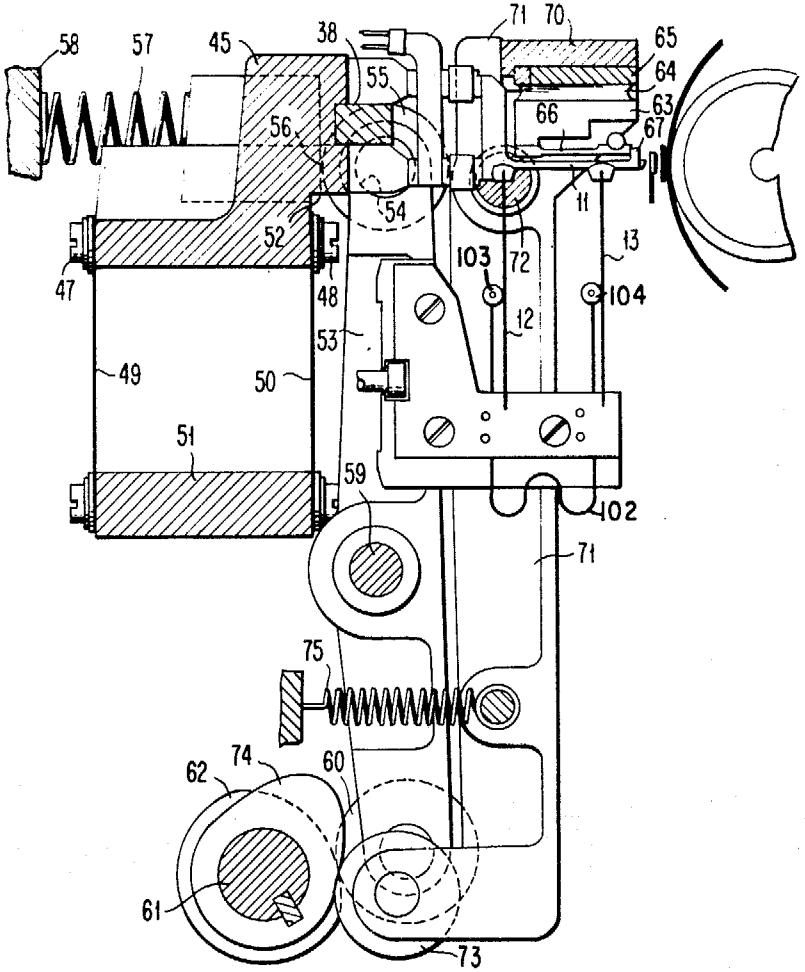
FIG. 2 is a schematic partly sectional view of the drive of a print hammer unit in side elevation and in the rest position.
Figure 5:
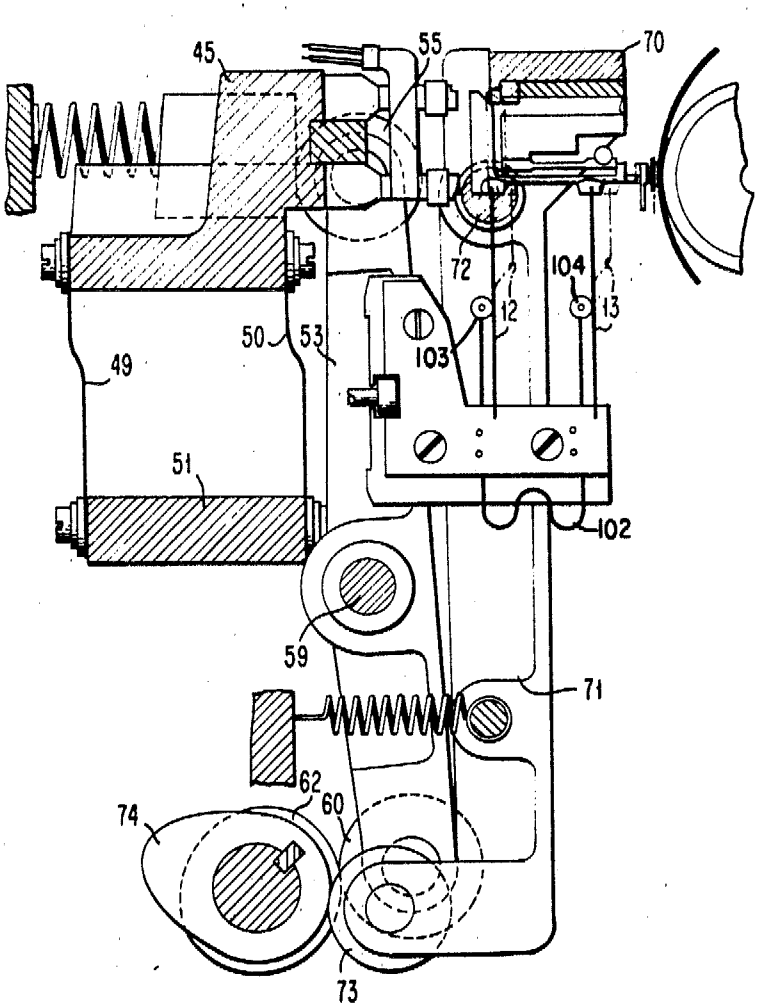
FIG. 5 is the same view as shown in FIG. 2 in an intermediate position shortly after a print hammer impact.
Figure 4:
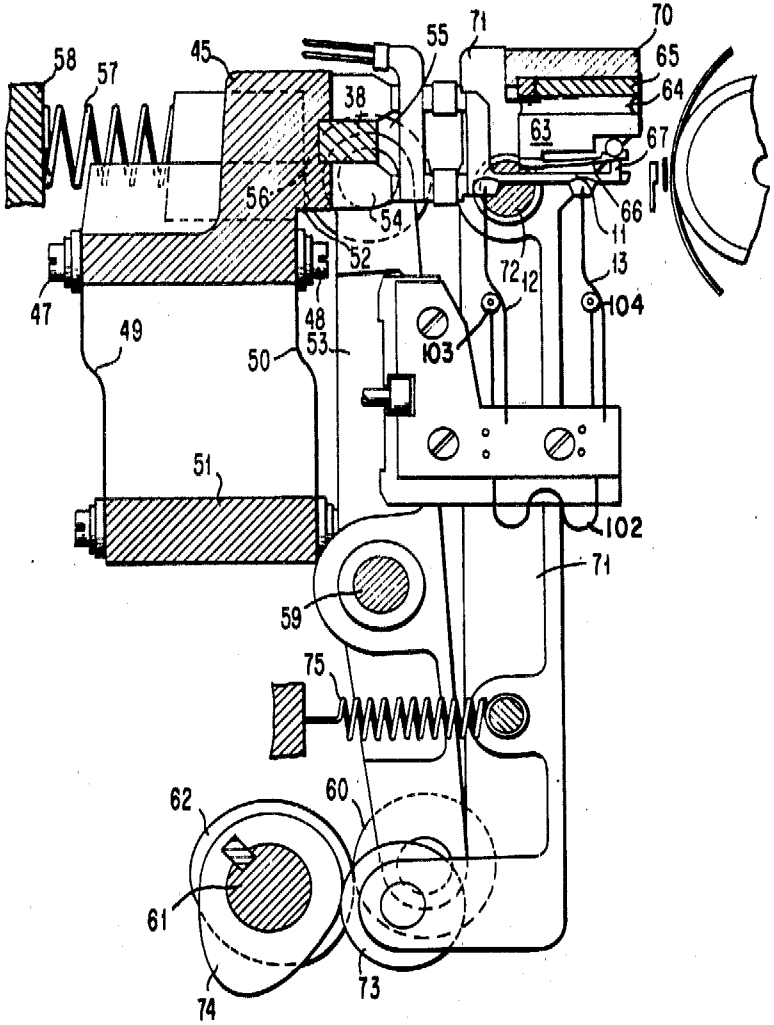
FIG. 4 is the same view as shown in FIG. 2 but with the print hammer springs tensioned.

In the printing unit shown in FIG. 1 a type bar 1 is used as a type carrier which can be shifted longitudinally in a print line direction and which is designed in a comb-like form. The type bar 1 is secured to a tube 2 which moves in a guide 3. The type bar 1 is equipped with elastic tongues 4 to whose free and print types 5 are fixed. The spacing of the individual tongues corresponds with the spacing of the print positions of the print line. During printing the print types 5 are moved against a paper sheet 7 placed over a platen 6. Ribbon 8 is guided over the paper sheet 7. A stop bar 10 inserted in the guide block 9, in which the guide 3 is formed in part, limits the forward movement of the elastic tongues 4.

At each print position a print hammer 11 is provided which at a suitable moment, i.e., when through shifting of the type bar 1, the type to be printed is in the corresponding print position, strikes against the head of the elastic tongue 4 and thus effects the printing of the corresponding type. The print hammers 11 are secured at the heads of two leaf springs 12, 13 which in turn are clamped at their foot end in a foot plate 14. The hardness of the leaf springs 12, 13 is selected in such a manner that the springs are to be regarded as rigid with respect to pressure, tension, and torsion. They are only exposed to a bending action. Thus the movement of the print hammer secured to said springs principally consists of a parallel motion.

Figure 6:
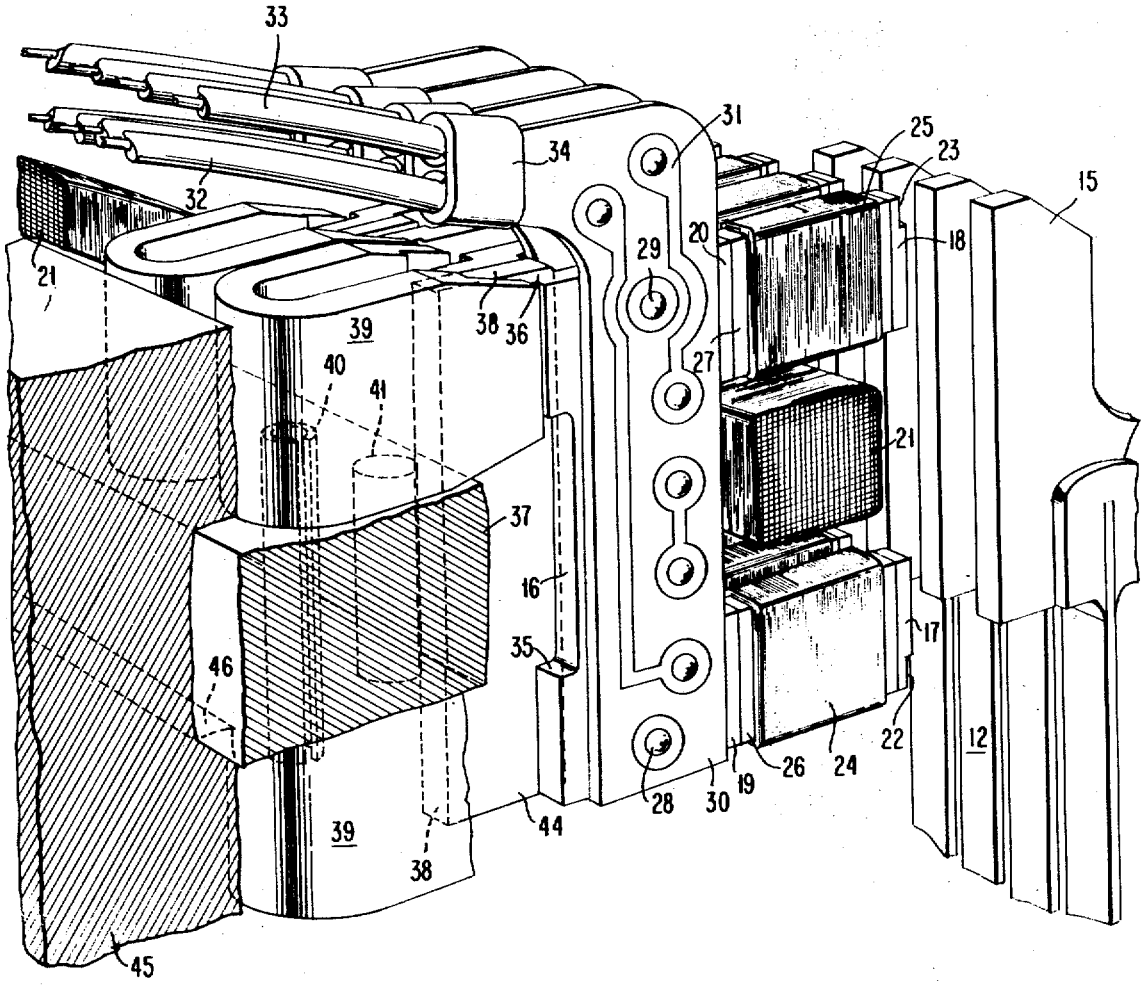
FIG. 6 is an enlarged view of the holding magnets and their support means.
Figure 8A:
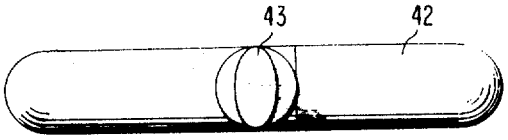
FIGS. 8a and 8b are top and side views respectively of the key used for adjusting the holding magnets and opening the support clamps.

The print hammers, which may be considered as formed of little rods consisting of one piece, and are normally held in a tensioned state through a holding magnet. For that purpose they are L-shaped and have a bent projection 15 which serves as a magnetic armature (FIG. 6). With each armature 15 a magnet yoke 16 is associated which is H-shaped. Pole faces 17, 18 lie at the ends of the free legs 19, 20 of the yoke 16 opposite the armature 15. A magnet winding 21 extends over all the magnet yokes 16 and is housed in the cavity in the legs 19, 20 and continuously carries current during operation, so that the holding magnets for the individual print hammers are continuously excited. Legs 19, 20 of the magnet yokes 16 have ledges 22, 23 near the pole faces at which the cross section of the yokes is reduced. It thereby results that the magnet yoke 16 within the area of their pole faces 17, 18 are magnetized to the saturation point, and thus the holding force of the holding magnets is independent of voltage variations. In addition, the holding winding 21 is connected in series with an inductance device L of a relatively high value (FIG. 12a) in order to avoid the effects of variations in the magnetizing force of the holding circuit during the firing of the print hammers.

For the conrtollable release of the tensioned print hammers held by the hold magnets 16, windings 24, 25 are arranged on the free legs 19, 20 of the magnet yokes 16, the magnetic field of which is formed upon applying an electric pulse, being in an opposite direction to the field of the hold magnet at the respective print position. The windings 24, 25 are of low inductance and the ampere turn value is regulated in such a manner that the magnetic field of the holding magnet is not only neutralized or compensated for through the release of bucking windings 24, 25 but is overcompensated for. Thus the crossover of the resulting magnetic field comes into the range of the rapidly increasing field of the compensating windings, and a very short and exactly reproducible release or dropping time of the print hammers is obtained. The compensating windings 24, 25 are arranged by means of the insulation support sleeves 26, 27 on the legs 19, 20 of the magnet yokes 16, without the use of the usual spools. They are connected in series and have their connections made to an insulating plate 30 mounted on the magnet yoke through rivets 28, 29, and upon which plate they are soldered to a printed circuit 31. The lines of the printed circuit are in turn connected to flexible leads 32, 33 which are secured to the insulation plate 30 by means of a clamp 34.

Figure 7:
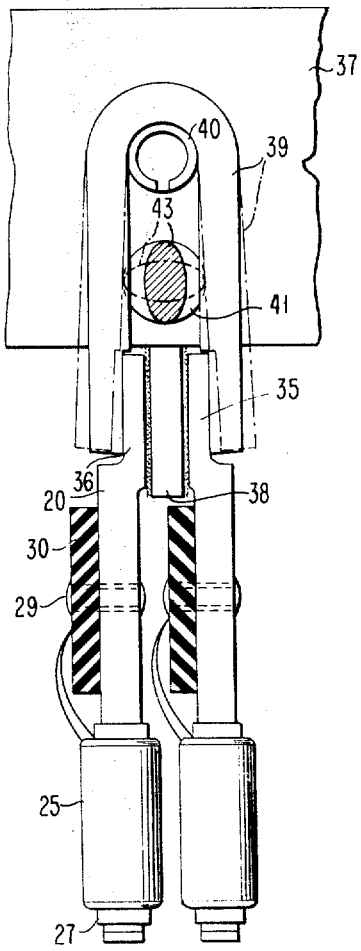
FIG. 7 is a plan view of the holding magnets with their supporting clamps.
Figure 8:
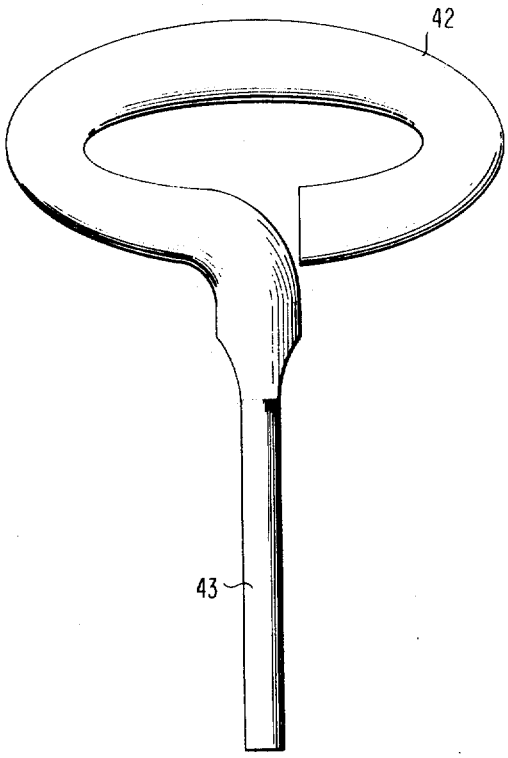

As already mentioned, the magnet yokes 16 are H-shaped. The legs 35, 36 opposite to those on which the windings 24, 25 are disposed, serve as supports (FIG. 7). On a support bar 37 vertical bridges 38 are mounted with regular spacing, against whose both flanks two respective magnet yokes 16 are located by means of their legs 35, 36. The magnet yoke legs are pressed against the bridges 38 by means of two tensioned and elastic U-clamps 39. A spring sleeve projecting from a hole 40 drilled through the support 37 serves as a stop for the tensioned clamps 39. Support 37 has also holes 41 which serve for receiving a key 42, the shaft of which has an oval cross section (FIG. 8). By means of inserting key 42 in the holes 41, the clamps 39 can be opened by simply turning the key whereupon the magnet yokes 16 can be released from their support.

This arrangement allows the easy and quick adjustment of the various magnets, which at the small tolerances normally necessary in such printing devices, always offers a problem of particular complexity; with the winding 21 energized and the holding magnets 16 and armatures 15 in the rest position, the support 37, in a manner which will be explained hereinafter in this text, will be moved to bring the magnet yokes 16 toward the magnetic armatures 15. Next, the clamps 39 are opened one after the other by inserting and turning the key 42, so that the individual magnet yokes 16 are free to locate themselves independently with their armature 15 under the influence of the magnetic force of the holding winding 21 without any air gaps being formed. In order to avoid a shafting of the magnet yokes in a preferred direction upon the closing of the clamps, hard $Al_2O_3$ crystals 44 are impregnated in the contact faces of the bridges 38, the points of which are protruding from the surface embed themselves in the softer metal of the magnet yokes and thus prevent any sliding of the adjusted magnet yokes.

A restore bail 45 is provided to which is connected the support 37 and which is supported on leaf springs 49, 50 so as to be movable to bring the magnets 16 into juxtaposition with their respective armatures 15. Movement of the restore bail 45 and consequently also of the magnet yokes 16 is effected through a drive which in FIGS. 2–5 is shown in various positions. The restore bail 45 has a ledge 52. In the cavity formed thereby a roller lever 53 protrudes from below. On this lever roller 55 is supported by means of axle 54, said roller engaging with the restore bail at the contact line 56. The restore bail is in turn pressed against the roller 55 by a helical spring 57 which is supported by a stationary machine part 58. Roller lever 53 is supported on an axle 59. On its other lever arm it carries a roller 60 which engages with a cam disc 62 mounted on axle 61.

Figure 9:
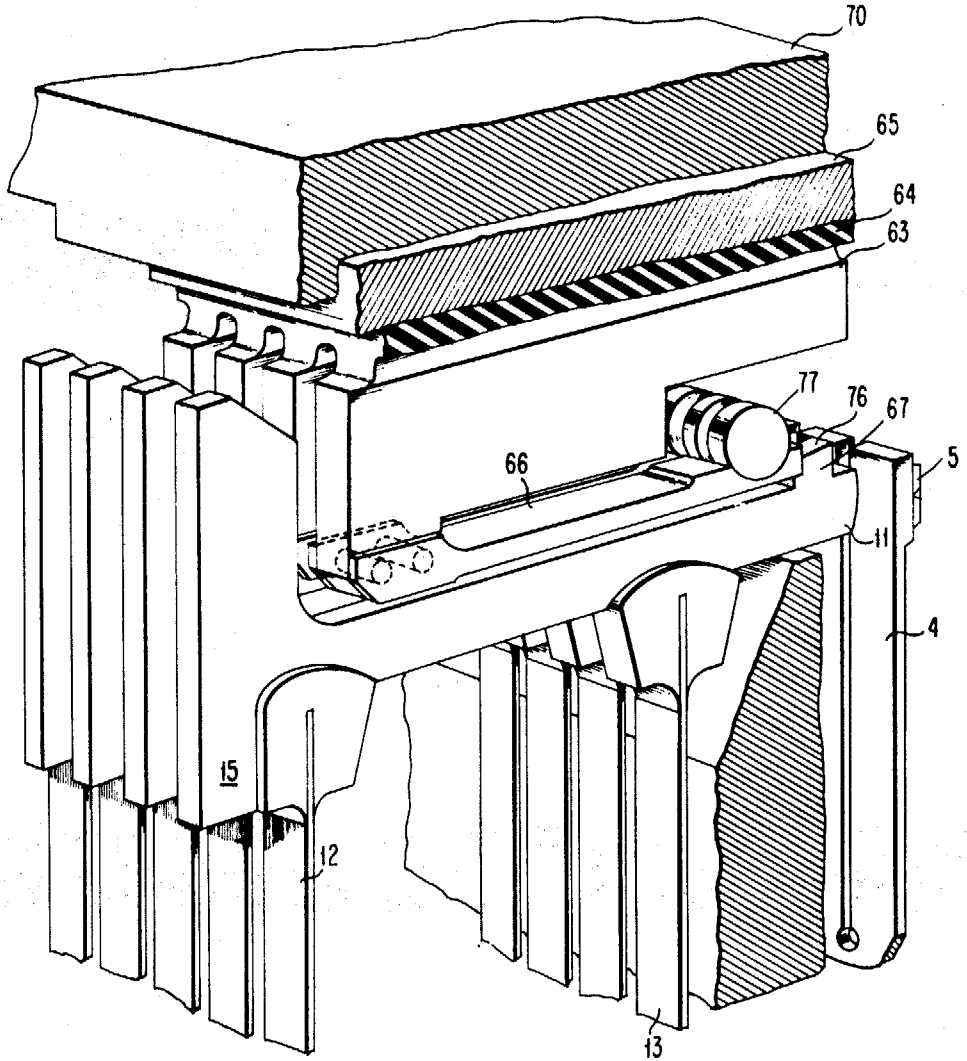
FIG. 9 is an enlarged perspective view of the dampers at the moment of becoming effective upon the restore of the print hammers.

For receiving the motion energy of the print hammers moving back after a print impact dampers 63 are provided for the individual print hammers, the damper mass of which corresponds approximately to the mass of the print hammer (FIG. 9). The damper material 63, which is secured to block 65 through the layer of rubber 64, engages with the print hammers by means of locking levers 66 and consists of elastic material such as a nylon composition, said levers being secured thereto at the lower edge. For that purpose the print hammers have upwardly projecting stops 67 which push against the front side of the locking levers 66 during backward motion. For releasing the locking levers and for allowing the continued backward motion of the print hammers, the dampers are mounted pivotally, the locking levers 66 being pivoted out of the path of the print hammer. The damper block 65 is for that purpose connected to a rail 70 by means of screws 68, 69, said rail being in turn secured to an arm of a pivoted lever 71. The lever 71 is mounted on axle 72 (FIGS. 2–5). This axle is arranged in an offset or staggered position in a downward direction from the supporting point of locking lever 66, so that upon upward motion of the locking lever there is little or no interference between the print hammer and the locking lever. At the other arm of the pivoted lever 71 a roller 73 is supported for engaging with a cam disc 74 which is also mounted on axle 61. Roller 73 is engaged with the disc 74 by means of springs 75.

Thus the operation motion is as follows. In the rest position the leaf springs 12, 13 are not tensioned and are in a relatively flat position. The restore bail 45 is moved far enough to the front (to the right in FIGS. 2–5) that the magnet yokes 16 secured to it touch the armatures 15. If the holding winding 21 on the magnet yoke 16 is energized, the armatures 15 are held magnetically at the pole shoes of the magnet yokes. If now the shaft 61 starts its turning motion, lever 71 is pivoted by means of the cam disc 74 so that the locking lever 66 is lifted upwardly out of the print hammer path. Under the influence of the cam disc 62 the restore bail 45 and support 37 are then moved back to the left. The print hammers are carried along in the process and the springs 12, 13 are thus tensioned. The damper mass 63 returns to its original position in the meantime. The locking levers 66 are now located with a light spring tension against the sloping faces of the print hammer stops 67. If now a print hammer is released from the magnet yokes 16 by one of the compensating windings 24, 25 receiving a pulse of electrical energy, it jerks forward, strikes the print type against the paper sheet and is stopped in its return motion by the damper locking lever 66. The locking lever 66 is equipped with a weight 77 so as to make sure that upon the effecting of a print impact, the damper is already returned to the locking position. After all of the print hammers have been released for the line to be printed, the restore bail 45 is moved forward again by the cam disc 62, so that the released print hammers may be secured by their respective magnet yokes.

The leaf springs 12, 13 carrying the print hammers 11 are fixed with their lower ends secured in the foot platen 14 as already mentioned. Thus each print hammer forms a structural unit with its mounting and if necessary it can be removed and exchanged very easily. Two associated foot plates 14 are connected with each other by means of screws 78, 79, and 80 as shown in FIG. 1, the guide plate 81 being interposed therebetween. The guide plate 81 is located with its stop faces 82, 83, and 84 against the block 85 and the cover plate 86, and on the other side it is inserted in slots 87 of a plate 88. It is secured to the block 85 by means of screw 89 and lock nut 90. The holes in the foot plate 14 and the guide plate 81 for the screws 78, 79, and 80 are sufficiently large to provide clearance for the screws so that the print hammer units can be adjusted individually.

Figures 10, 11:
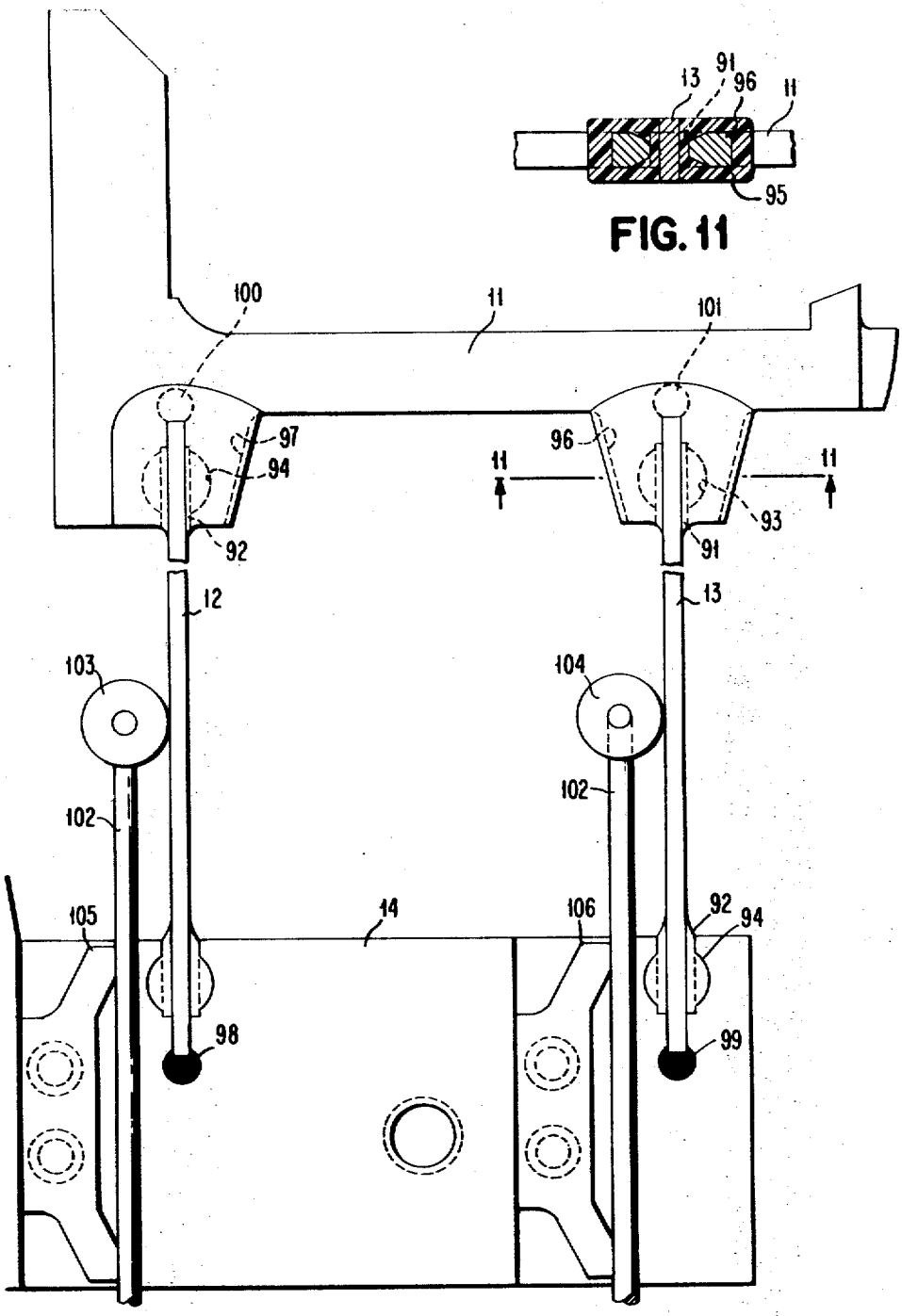
FIG. 10 is an enlarged side view of a print hammer and its support.
FIG. 11 is a sectional view along the line 11—11 of FIG. 10 showing more clearly the securing of the leaf springs at their clamping points.

The securing of the leaf springs 12, 13 is effected at the top as well as at the lower end in an elastic junction (FIGS. 10, 11). The slots receiving the ends of the leaf springs (slots 91, 92) are of increased width in the upper portion. Besides that, they are enlarged towards their outer edges so as to form a cone-shaped funnel 93, 94. The rivet-shaped cavity formed in this manner is filled with an elastic synthetic material 95 such as, for example, a nylon composition. At the top ends of the leaf springs shoulders 96, 97 of the print hammers are surrounded by the synthetic material 95 in order to extend the elastic junction over the whole width of the leaf spring, which is wider than the width of the print hammer, the elastic material being tapered in thickness towards the midpoint of the springs. At their extreme ends 98, 99, 100, and 101 the leaf springs are welded or otherwise suitably secured to the print hammers and the foot plates, respectively.

In order to adjust for variations in the thickness of the leaf springs 12, 13, spring U-bolts 102 are provided which are slidably movable along the leaf springs, said U-bolts fitting against the leaf springs at their ends with small rollers 103, 104 of synthetic material. The U-bolts are positioned in grooves provided in opposite faces of, and are locked in the foot plates 14, through the use of elastic locks 105, 106 positioned in the grooves 107, 108 and fitting against the bolts under pressure. These slidable U-bolts have the function of adjusting the action of the springs 12, 13 to compensate for minor manufacturing tolerances in the thickness of the leaf springs, and permit a relatively fine adjustment of the hammer flight time.

Figure 12A:
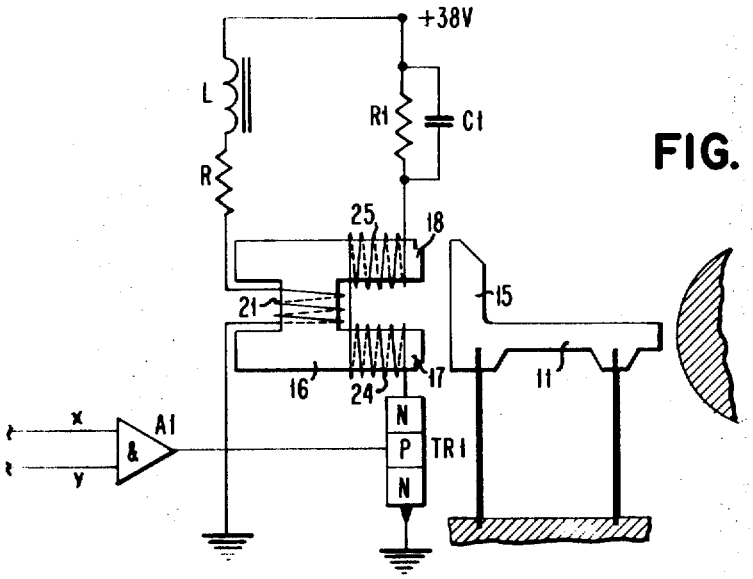
FIG. 12a is a schematic diagram of the circuits for the holding magnets together with the bucking windings therefor.

Referring to the FIG. 12a, it will be seen that the holding winding 21 which is common to all of the magnetic yokes 16 is connected to the positive terminal of a 38 v. source and to ground, through an inductance device L and a series resistor R. The bucking or neutralizing windings 24 and 25 of the individual magnet yokes 16 are also connected to the same source through a resistor R1. The series resistor R1 is bridged by a capacitor C1 in order to effect a quick rise time of the magnetizing current. Again it is emphasized that the holding winding 21 is common to all of the magnet yokes 16 whereas the bucking windings 24 and 25 are individually arranged on each yoke and can be controlled individually.

For that purpose, the other end of the series connected windings 24 and 25 is connected to the collector of a transistor TR1 whose emitter is connected to ground or zero potential. Normally the transistor TR1 is turned off, but if a pulse is applied to its base by way of the AND switch A1 this transistor is turned on, and the bucking windings 24, 25 are excited for a relatively short time.

The transistors TR for each of the print positions are controlled as follows. The memory storage of the machine contains the text of a print line. By comparison with an electronic image or representation of the character on the type bar it is determined after each step of the type bar how many further steps of the type bar are required each time in order to make sure that a type character corresponding to the character to be printed in a particular position is located opposite this printing position. If the number of steps required equals zero, that is, if a character to be printed lies opposite the particular printing position in question, the corresponding AND switch A1 is prepared by raising the line x. When this has been carried out for all of the printing positions for a particular position of the type bar, a pulse is applied to raise the line y of all AND switches A. Thus the transistors TR1 are turned on and the corresponding windings 24, 25 are energized, so that the print hammers are released, and a print impact is obtained in all of those printing positions where the AND switches A have been prepared by raising the line x. By having the bucking windings 24 and 25 producing a sufficiently strong magnetic field, the magnetic field of the holding winding 21 is more than neutralized, and is overcompensated, thereby forcing collapse of the holding magnet field more rapidly and a reduction of the hammer flight time and a stabilization of the system is obtained.

Figure 12B:
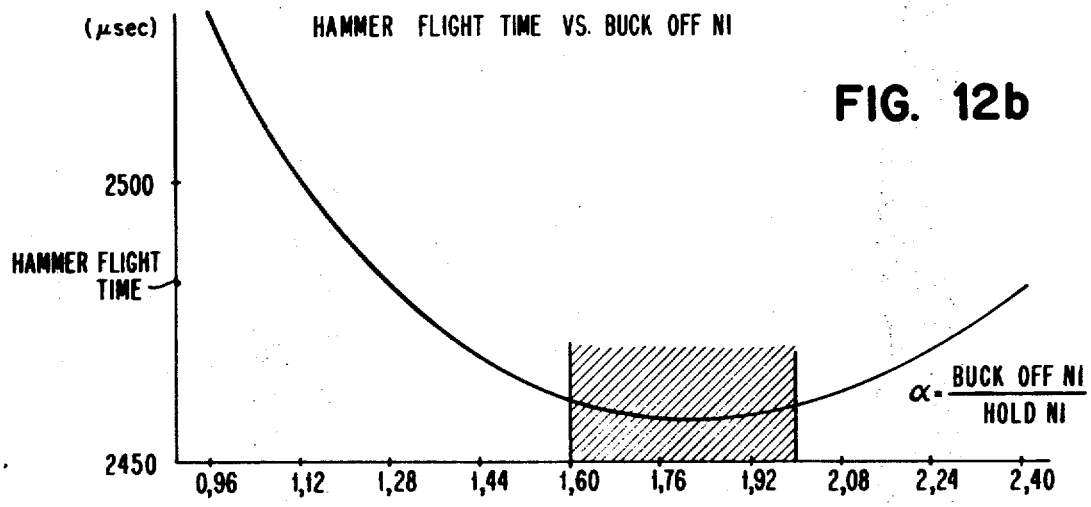
FIGS. 12b and 12c show curves illustrating the hammer flight time v. bucking ampere turns and voltage, respectively.

In FIG. 12b the hammer flight time dependency on the ratio of the ampere turns of the bucking windings and of the holding winding, is shown. This shows clearly that the hammer flight time decreases with increasing values of a, and that between the values 1.6 and 2.0 it passes through a very flat minimum and that it subsequently rises again. The most favorable value of a is at approximately 1.76; considerable variations in the values can occur, however, without there being any exceptional change in the hammer flight time, because of the flatness of the curve in this area.

Figure 12C:
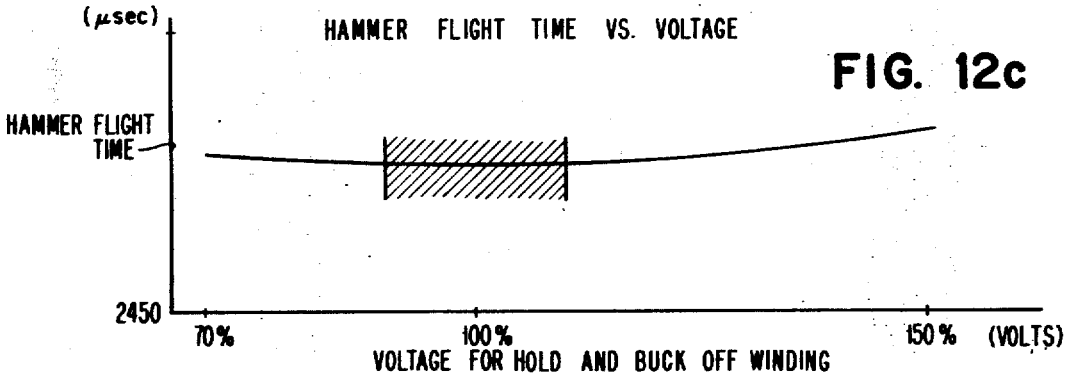

The low influence of voltage variations can be seen by referring to FIG. 12c where the hammer flight time is plotted against relative variations in the potential of the 38 v. source. In both FIGS. 12b and 12c the normal variations are indicated by the hatched areas.

While the invention has been particularly shown and described with reference to a preferred embodiment thereof, it will be understood by those skilled in the art that various changes in form and details may be made therein without departing from the spirit and scope of the invention.

What is claimed is:

1. In a print hammer unit for a high speed printer having movable means for presenting a plurality of type characters at a print line for cooperative print action by print hammer means, a print hammer having a hammer portion adjacent the print line at each of a plurality of print positions and having an armature portion, resilient support means for each of said hammers including a pair of parallel flat spring members, means including electromagnetic means having a separate magnetic yoke at each print position with a single hold winding common to all of the yokes operable to produce magnetic flux in said armature portions to hold said armature portions away from the print line and flex said spring members to store potential energy therein, means operable to effect movement of said hammers in response to said stored energy by reducing the flux in the armature portions below the holding point to effect release of said hammers.

2. In a print hammer unit, the combination in accordance with claim 1, characterized in that for the deactivation of the electromagnets holding the tensioned print hammers, individual release windings are arranged at the various print positions on the magnet yokes in such a manner that the magnetic field produced by them neutralizes the holding magnet field and removes it from the armature, respectively.

3. In a print hammer unit, the combination in accordance with claim 2, characterized in that the magnetic field of the holding magnet is neutralized through the magnetic field of the releasing magnet individual to the corresponding print position.

4. In a print hammer unit, the combination in accordance with claim 3, characterized in that the holding coil which is common to all magnet yokes and continuously carrying current is connected to a source of electrical energy in series with an inductance device of a high value.

5. In a print hammer unit, the combination in accordance with claim 4, characterized in that the magnet yokes near the pole faces have a cross section which is reduced compared with the remaining magnetic circuit, and that in this area they are magnetized to the saturation point.

6. In a print hammer unit, the combination in accordance with claim 5, characterized in that the magnet yokes, preferably in pairs, are fixed on bridges mounted on a common carrier by means of tensioned clamps.

7. In a print hammer unit, the combination in accordance with claim 6, characterized in that the surfaces of the bridges, and the inside jaws of the tensioned clamps pressing the magnet yokes against the bridges, are impregnated with hard crystals, preferably sintered $Al_2O_3$ (corundum).

8. In a print hammer unit, the combination in accordance with claim 7, characterized in that the magnet yokes are aligned individually towards their print hammers in such a manner that they automatically locate themselves when the holding magnet is excited and clamps opened by means of a key, and under the influence of the magnetic forces the tensioned clamps are held against the corresponding armature without an air gap being formed.

9. In a print hammer unit, the combination in accordance with claim 8, characterized in that carrier of the magnet yokes is supported on leaf springs and arranged in shiftable manner, and that cam means is provided to actuate the carrier and provide a motion which goes back and forth periodically and which is also directed perpendicular to the platen, said motion serving for the restoring of the fired print hammers.

10. In a print hammer unit, the combination in accordance with claim 9, characterized in that the print hammer units; preferably in pairs, are fixed in such a manner that they can be adjusted individually, as they are secured to their foot plates by stationary guide plates.

11. In a print hammer unit, the combination in accordance with claim 10, characterized in that the leaf springs carrying the print hammers are surrounded at their top and lower ends with coatings of elastic material which fill cavities recessed in the print hammers and the foot plates, said cavities having the spring ends welded to their innermost ends, and that these coatings taper continuously towards the middle of the spring.

12. In a print hammer unit, the combination in accordance with claim 11, characterized in that spring U-bolts are provided which are shiftable along the leaf spring pairs carrying the print hammers, which further fit with their end points against the leaf springs intermediate the ends thereof, and which are combined structurally through being slidably supported in the foot plate of the corresponding print hammer unit, so that these bolts serve for the adjustment of the hammer flight time.

13. In a print hammer unit, the combination in accordance with claim 12, characterized in that at the individual print positions elastically fixed damper masses are provided which absorb the energy of the print hammers moving back after print impact, and which, by means of elastic locks block the print hammers until the magnet yokes are moved to their front extreme positions to seize the print hammers.

14. In a print hammer unit, the combination in accordance with claim 13, characterized in that the damper masses are fixed on a common carrier extending over all print positions, pivotally supported with its pivot point positioned below the elastic locks, said carrier being pivoted for movement for a short time for releasing the print hammers, preferably by means of a cam gear.

*15. In a flexure spring mounting arrangement wherein at least one flexure spring means is joined to a relatively rigid member at a bonding surface thereof so as to be bent flexingly with respect thereto, an improved composite joining arrangement comprising:*

*cavity means for each spring means extending into said surface of said member; metallic bonding means fixedly connecting one end of each said spring means to said member, at the inner portion of said cavity means; and elastomeric fillet means adhered between each said spring means and said member along a portion of said spring means adjacent said connection with said bonding means so as to graduate the stiffness gradient and damp out extreme stresses therealong.*

*16. The combination as recited in claim 15 wherein said bonding means is adapted to fuse with said member and each said spring means for a rigid bond in the innermost portion of said respective cavity means; wherein said fillet means fills the balance of each said cavity means; and wherein each said spring means comprises a flat strip flexure.*

*17. The combination as recited in claim 15 wherein said member is comprised of a rigid metal; wherein said bond connection comprises a welding between said flexure spring means and said metal member and wherein said elastomeric fillet means encapsulates and adheres the associated end of each said spring means, coupling it dampingly to said member.*

*18. In a hammer assembly including a rigid base member, a slug member and a pair of flexure strips mounting said slug member from said base member so as to be pivoted relative thereto at high speeds and under precise guided alignment over an extended operational life, the improvement in combination therewith of a composite bond arrangement between the base end of each said flexure strip and said base member, said bond arrangement comprising:*

*a pair of cavities provided in said member so as to include inner enlarged portions; rigid metal join means rigidly connecting the base ends of each of said flexure strips to said member at a respective one of said enlarged cavity portions; and graduated damping means coupling each said flexure strips to*

*said base member resiliently, adjacent said respective rigid metal connection, thereby occupying outer portions of said cavities.*

*19. A method for bonding a flexible spring member to a relatively rigid base member with improved maintenance of a fixed orientation therebetween as well as improved and extended operational life, no spring breakage and the like, said method comprising:*

*providing a cavity in said base member;*

*rigidly bonding one end of said spring member to said base member at the inner portion of said cavity by fusing material therebetween; and*

*coupling a graduated-flexibility damping means between said members, along a portion of said spring member adjacent said fusion bond.*

*20. The combination as recited in claim 19 wherein said rigid base member comprises a metal base frame; wherein said spring member comprises flexure strips; wherein said rigid bond is provided by welding the base ends of said flexure strips each to an associated portion of said frame; wherein said damping means is provided by flowing an elastomeric potting compound about portions of said frame and about said spring members, at least adjacent said welds, and curing it both to encapsulate said frame portions and to provide said stress damping adjacent said welds.*

References Cited

The following references, cited by the Examiner, are of record in the patented file of this patent or the original patent.

UNITED STATES PATENTS

| | | | |
|---|---|---|---|
| 2,940,385 | 6/1960 | House | 101—93 |
| 3,041,964 | 7/1962 | Simpson et al. | 101—93 |
| 3,144,821 | 8/1964 | Drejza | 101—93 |
| 3,145,650 | 8/1964 | Wright | 101—93 |
| 3,156,180 | 11/1964 | Barnes | 101—93 |
| 3,172,352 | 3/1965 | Helms | 101—93 |
| 3,188,946 | 6/1965 | Schacht | 101—93 |
| 3,209,682 | 10/1965 | Cooper | 101—93 |
| 3,266,418 | 8/1966 | Russo | 101—93 |
| 3,289,575 | 12/1966 | Wasserman | 101—93 |
| 3,049,990 | 8/1962 | Brown et al. | 101—93 |

WILLIAM B. PENN, Primary Examiner

U.S. Cl. X.R.

29—428